(12) United States Patent
Klarer

(10) Patent No.: US 9,855,508 B2
(45) Date of Patent: Jan. 2, 2018

(54) WATER SLIDE SYSTEM AND OPERATING METHOD

(71) Applicant: KLARER FREIZEITANLAGEN AG, Hallau (CH)

(72) Inventor: Stefan Klarer, Hallau (CH)

(73) Assignee: KLARER FREIZEITANLAGEN AG, Hallau (CH)

( * ) Notice: Subject to any disclaimer, the term of this patent is extended or adjusted under 35 U.S.C. 154(b) by 0 days.

(21) Appl. No.: 15/438,328

(22) Filed: Feb. 21, 2017

(65) Prior Publication Data

US 2017/0157520 A1    Jun. 8, 2017

Related U.S. Application Data

(63) Continuation of application No. PCT/EP2015/058844, filed on Apr. 23, 2015.

(51) Int. Cl.
| | |
|---|---|
| *A63G 21/18* | (2006.01) |
| *A63G 31/16* | (2006.01) |
| *A63G 31/00* | (2006.01) |
| *G09G 3/32* | (2016.01) |

(Continued)

(52) U.S. Cl.
CPC .......... *A63G 21/18* (2013.01); *A63G 31/007* (2013.01); *A63G 31/16* (2013.01); *G09G 3/2003* (2013.01); *G09G 3/32* (2013.01); *H04N 13/0422* (2013.01); *H04N 13/0429* (2013.01);

(Continued)

(58) Field of Classification Search
CPC ........ A63G 21/00; A63G 21/18; A63G 31/00; A63G 31/007; A63G 31/16; A63G 7/00; A63J 5/00; A63J 25/00

USPC ................... 472/116, 117, 128, 129, 60, 61; 104/69–70

See application file for complete search history.

(56) References Cited

U.S. PATENT DOCUMENTS

| | | |
|---|---|---|
| 4,630,908 A | 12/1986 | Tremblay |
| 5,482,510 A | 1/1996 | Ishii et al. |
| 7,762,898 B2 | 7/2010 | Lunde et al. |

(Continued)

FOREIGN PATENT DOCUMENTS

| | | |
|---|---|---|
| CN | 202036787 U | 11/2011 |
| GB | 2 309 394 A | 7/1997 |
| WO | WO 2006/116176 A2 | 11/2006 |

OTHER PUBLICATIONS

International Search Report of related International Patent Application No. PCT/EP2015/058844 dated Jul. 21, 2015.

*Primary Examiner* — Kien Nguyen
(74) *Attorney, Agent, or Firm* — Arent Fox LLP

(57) ABSTRACT

The disclosure relates to a water slide system including an at least partly translucent or transparent slide tube which may be circumferentially closed and in which a slide surface that can be wetted with liquid extends in a slide direction. Lighting features that are visible from the interior of the slide tube are arranged on the outside of the slide tube in order to achieve optical effects in the interior of the slide tube. According to an aspect, the lighting features are pixels, for example LEDs, which are arranged in a matrix of at least one screen module. The screen module may be in the shape of a shell that extends on the outside of the slide tube and over a circumferential portion of the slide tube and which can be actuated in order to display movable two-dimensional or stereoscopic images, which may be curved in the circumferential direction.

22 Claims, 4 Drawing Sheets

(51) Int. Cl.
*G09G 3/20* (2006.01)
*H04N 13/04* (2006.01)
(52) U.S. Cl.
CPC ..... *H04N 13/0468* (2013.01); *H04N 13/0486* (2013.01); *G09G 2300/026* (2013.01); *G09G 2320/10* (2013.01)

(56) References Cited

U.S. PATENT DOCUMENTS

| | | | |
|---|---|---|---|
| 7,967,692 B2 * | 6/2011 | Werner | A63G 21/18 434/44 |
| 2011/0287848 A1 | 11/2011 | Bradley et al. | |
| 2013/0032053 A1 | 2/2013 | Stoker | |
| 2013/0244801 A1 | 9/2013 | Frolov | |

* cited by examiner

WATER SLIDE SYSTEM AND OPERATING METHOD

CROSS-REFERENCE TO RELATED APPLICATIONS

This application is a continuation of International Application No. PCT/EP2015/058844 filed Apr. 23, 2015, which claims priority to German Application No. 10 2014 111982.7 filed Aug. 21, 2014 and German Application No. 10 2014 117 250.7 filed Nov. 25, 2014. Each of these priority applications is incorporated herein by reference.

BACKGROUND OF THE INVENTION

Field of the Invention

The disclosure relates to a water slide system. In particular, the disclosure relates to a water slide system including a circumferentially closed slide tube that is translucent or transparent, at least in sections, and in which a slide surface that is wettable with water and extends in a slide direction is provided for a user, wherein lighting features that are visible from the interior of the slide tube are situated on the outer side of the slide tube in order to achieve optical effects in the interior of the slide tube. The discosure further relates to a method for operating a water slide system.

Description of Related Art

Water slide systems comprising a circumferentially closed slide tube are well known. For generating light effects in the interior of the tube, it is known to equip the outer side of the slide tube with separate light emitting diodes (LEDs), for example for simulating a starry sky, or with an LED strip. The achievable optical light effects do not extend beyond blinking or continuous light effects.

A water slide is known from U.S. Pat. No. 7,762,898 B2, having lighting means situated on its periphery for achieving light effects.

A tube is known from U.S. Pat. No. 5,482,510 A which, among other things, may be slid through. Various light effects such as stereoscopic light may be achieved to evoke various feelings in the user.

A water slide having an audiovisual entertainment system is known from WO 2006/116176 A2, wherein images may be projected into a water curtain by means of a projector.

BRIEF SUMMARY

In view of the above-mentioned prior art, the disclosure provides a water slide system including at least one slide tube section via which the slide experience for the user is improved by implementing elaborate optical effects. The aim in particular is to provide the water slide system in such a way that the subjective feeling of acceleration or sliding speed and/or a feeling of direction are/is influenceable. Moreover, the system may provide a method for operating such a water slide system.

In an aspect, the lighting features are formed from pixels, which may include LEDs, for example, arranged in a matrix of at least one screen module (LED module or digital image area), which in turn is arranged and/or designed in the manner of a shell on the outer side of the slide tube and extending over a circumferential section of the slide tube, and which is actuatable and/or actuated in order to display, for example, moving two-dimensional and/or stereoscopic images that are curved in the circumferential direction.

In an aspect, a water slide is designed, at least in sections, as a screen slide, i.e., in such a way that two-dimensional and/or stereoscopic, preferably moving, images that are curved in the circumferential direction of the slide tube are displayable from the interior of the slide tube, i.e., are visible to a user when sliding, via which, for example, the subjective feeling of acceleration and/or velocity and/or slide direction of the user may be influenced. As a result of an image that is uniform or repeating, or which moves or shifts opposite the slide direction, for example in the form of moving arrows or the like, in particular over a time period of several seconds, it is thus possible to achieve an impression of speed that is greater than the actual sliding speed. Additionally or alternatively, it is possible to display visually changing light and/or color effects in the form of two-dimensional and/or stereoscopic stationary images or videos (images moving in two dimensions and/or stereoscopically).

In one aspect, the image may extend over a circumferential angle of at least 120°, preferably at least 180°, and/or over a length of at least one meter, particularly preferably over at least five meters, even more preferably over at least 10 meters or longer, in the slide direction. The resolution of a screen module may be preferably at least 100×100 pixels, and more preferably 250×250 pixels. In an aspect, multiple screen modules having such a resolution may be provided, for example, next to one another in the circumferential direction and one behind the other in the slide direction. The screen modules may be actuated in such a way that an overall image is displayable with the screen modules, for which purpose the multiple screen modules are connected, preferably in a signal-conducting manner, to a so-called video splitter that divides an overall image over the multiple screen modules, i.e., into partial image sections.

As the result of images moving in the circumferential direction, it is additionally or alternatively possible to create a subjective turning device pressure that suggests to the user that he/she is moving in the circumferential direction, i.e., to the right or left. It is also possible to impart the subjective impression of a slower sliding speed by moving image content in the slide direction. To achieve this effect, identical or similar image contents are preferably selected, at least over a certain time period, which progress from pixel to pixel in the desired direction, i.e., appropriately moved forward by actuating features on a screen module and preferably shifted from screen module to screen module.

In order for a sharp image to result for the user, the slide tube may have a translucent or transparent design in sections, in particular in the areas that are provided with the at least one screen module. Acrylic glass, for example, may be used for a transparent design.

However, a translucent, for example opaque, design may be preferred in some implementations, since this approach may allow, for example, only the pixels of the at least one screen module to show through and be visible to the user, and the remaining module technology may remain concealed. In particular materials such as glass-fiber reinforced plastic (GFRP), polycarbonate, and Plexiglas may be suitable for a translucent design.

Surprising synergistic effects may also result, in addition to the novel slide experience and the achievable optical effects. Due to integration of the at least one screen module into a water slide system, good heat dissipation from the pixels, preferably composed of LEDs, may be ensured in an innovative manner, such as when the pixels directly contact the outer side of the slide tube, i.e., lie against it on the outside. As a result of the direct contact, heat may be released to the translucent or transparent slide tube material. This material is in turn may be cooled, at least in sections, by the slide water present in the water slide or the slide tube.

The screen module (LED module/digital image area) may preferably have the following minimum specifications: Flex display and/or LED pixel pitch of 7 mm, and/or a pixel density ≥15,876 per square meter, and/or a brightness >5000 nits, and/or a power consumption of 250 W/m², and/or a viewing angle of 120°, and/or a refresh rate 1800 Hz, and/or a moisture resistance 99%, and/or 16,000,000 colors.

Thus, a curved screen may thus be used, for example, to directly surround the slide tube and may be cooled from the front side with water.

Another desirable effect may include that water flow or water film, which from the user's viewpoint, may occur in front of the image, may bring about interesting streak effects that are intensified by suitable images or distortion techniques, or may be at least partially be compensated for if needed.

Thus, one example water slide system designed according to the disclosure may have a slide tube that is directly associated with a curved image area composed of a plurality of pixels arranged in a matrix in order to provide the user with numerous novel visual impressions. An arrangement of pixels in a matrix is understood to mean, for example, that pixels may be situated along two axes that are spanned by an angle, in particular about 90°, one of the axes being curved in the circumferential direction of the slide tube, in particular having a radius of curvature that corresponds to the radius of curvature of the slide tube. The pixels may be arranged in rows and columns and may be individually actuated. The rows may preferably extend in parallel to the slide direction, while the columns of pixels may be oriented perpendicularly thereto, in order to follow the curvature of the slide tube in the circumferential direction or map the same, such as in a stepped manner. To ensure an image, which may be curved in the circumferential direction and which at the same time may further extend in two-dimensions and/or stereoscopically in the slide direction, is properly viewable, the screen module used may have a shell-like design. This approach may be achieved in a particularly innovative manner by connecting submodules (module surface sections) that may in each case be flat so that they extend, for example, in an articulated manner, in each case with two adjacent submodules enclosing an angle. With a preferred articulated connection of submodules or partial screen sections of a module, the module may be adapted to the individual radius of different slide tubes in a particularly innovative manner.

As mentioned, the water slide system designed according to the disclosure may include at least one, preferably shell-like, screen module suited for displaying curved two-dimensional images, for example, in the form of moving images (video). One embodiment of the water slide system may provide stereoscopic images that are displayable and/or displayed, for example, in the form of stereoscopic videos, on at least one screen module, and in some implementations, preferably multiple screen modules. In this way, a spatial impression of depth that is not physically present (except for possibly the curvature) may be imparted to the user. The principle of stereoscopy is based on the fact that a (human) user observes his/her surroundings simultaneously from two viewing angles through his/her two eyes. In this way, the brain of the user is able to efficiently associate a distance with all objects being observed, or to obtain a spatial image of his/her surroundings, without having to keep the head in motion. The stereoscopy, or in this specific case the stereoscopic actuation, of the at least one screen module only allows different (in each case two-dimensional) images to be brought into the left eye and the right eye of the user from two slightly different viewing angles. For this purpose, there are different methods known in the related art, but which have not been applied thus far within the scope of a water slide system. As explained in greater detail below, in one aspect, a shutter method, or alternatively a three-dimensional polarization system method, may be used, whereby, as explained in greater detail below, the user may wear appropriate channel separation features, such as glasses, while sliding. With this approach, images may be displayed simultaneously or in succession, depending on the applied method, and viewed by the eyes separately, in a defined manner. The screen module may be designed and actuated as a so-called stereo display to allow stereoscopic vision for the user, depending on the method, with or without channel separation aids, such as appropriate glasses (e.g., shutter glasses or polarized filter glasses).

In an aspect, the waterslide may include tubes having a circular or approximately circular cross section or partial such cross section, for example, having a diameter in a range between about 60 cm and 300 cm. Alternatively, it is also possible to use slide tubes having a circumferential contour that is different from a circular shape, for example oval slides, in which case a maximum is preferably selected from a value range of about 60 to 350, and a minimum diameter, extending perpendicularly thereto, is selected from a value range of about 50 to 300.

In one embodiment, images may be displayable in different ways, for example by changing colors using screen modules. This aproach may be achievable in a particularly innovative and simple manner by forming the pixels from multicolored light emitting diodes, such as two, three, or more differently colored LEDs, as is basically known, for example, from LED displays for large events.

In an aspect, the LEDs that are used within the scope of the screen module may be able to display a color spectrum of 16,000,000 colors or more.

In one embodiment of a water slide system, at least one screen module may be connected in a signal-conducting manner to actuating features, which may include a video processor, for example, in order to supply the screen module with a suitable actuating signal for displaying two-dimensional and/or stereoscopic, in particular multicolored, images. The actuating features may preferably be designed in such a way that they have a terminal for connection to an image source, such as a video source, and/or are connected to an image source. The image source, in particular video source, may be a media server, for example, or in the simplest case may be a suitable playback device, such as a video player, preferably in the form of a Blu-ray player or a DVD player. The input signal, with the aid of the actuating features, is then converted into a preferably multiplexed control signal for actuating the screen module.

It is particularly advantageous when the water slide system comprises multiple screen modules, not just a single screen module. In an aspect, the multiple screen modules, for example, having a shell-like design in each case, may be arranged adjacent one another sequentially in the circumferential direction in order to thus cover a preferably large circumferential angle, such as 120° or more, more preferably at least 180°, and very particularly preferably at least approximately 360°.

In addition or as an alternative to an arrangement of multiple screen modules in the circumferential direction, it is possible to arrange multiple screen modules one behind the other in the slide direction.

It has been found to be particularly advantageous when the actuating features for actuating the screen modules include a video splitter with which multiple screen modules arranged next to one another in the circumferential direction and/or one behind the other in the slide direction so as to be actuatable or actuated for displaying a moving overall image. Thus, image information provided by an image source (signal source) or video source may be divided over multiple screen modules, such as in a matrix confirguration.

In an aspect, the multiple screen modules, having a shell-like design in each case (analogously to the pixels of a screen module) may be arranged in a matrix and thus form an overall screen that, as explained in greater detail below, is preferably actuatable for displaying an overall image.

In an aspect, the actuating features may be designed in such a way that an image that extends over all pixels of a screen module and/or an image portion that extends over multiple screen points (in particular arranged in a matrix) may be displaceable from pixel to pixel and/or from screen module to screen module in the circumferential direction of the slide tube and/or in the slide direction and/or opposite the slide direction. In this manner, image content that is constant, in particular at least with regard to the image content contours, may be further displaced on a screen module, such as beyond the module boundaries, in at least one of the above-mentioned directions or in a resultant, for example diagonal, direction from a plurality of the above-mentioned directions, thus imparting an impression of motion.

It is thus possible, for example, to further displace a serrated geometry, extending in the circumferential direction, in the same or opposite direction as the slide direction and thus display a movement sequence. This approach may be particularly used, for example, when the above-mentioned image content (or some other image content) repeats, and the repetition as a whole is moved in the same or opposite direction as the slide direction. It is also possible to further displace image content, extending in the slide direction, in the circumferential direction.

As discussed above, in an example implementation, a shell-like screen module may be implemented that has multiple module surface sections that include pixels arranged in a matrix in a shared straight plane.; Alternatively, the arrangement may include only single rows of pixels within two adjacent flat module surface sections enclosing an angle, so that in the entirety of the module surface sections form a shell-like screen module that extends around the slide tube in the circumferential direction results. In one embodiment of the screen module, the module surface sections may be articulatedly connected to one another, thus allowing simple adaptation of the screen module and different radii of curvatures of different slide tubes.

In some cases, each module surface section may include multiple pixels arranged one behind the other in the slide direction, the entirety of the module surface sections or the pixels being arranged thereon in a matrix or in a row resulting in the pixel matrix of the screen module.

As discussed above, it is possible on the one hand to achieve an image that extends over the entire circumference of the slide tube. On the other hand, it is possible to achieve an image over only a partial circumferential section of the slide tube by arranging at least one screen module, or alternatively multiple screen modules next to one another, in the circumferential direction. In the latter-mentioned design, the circumferential angle section that is not occupied with screen modules may have an at least partially, and preferably completely or nearly completely, reflective design, for example by integrating a reflective foil into the slide tube. In this way, a particularly cost-effective option is provided for producing an overall image that extends, at least predominantly, over the entire circumference, since the images of the partial section occupied by screen modules reflect on the reflective surface.

To ensure optimized heat dissipation of the pixels that are preferably formed from LEDs, it has proven to be particularly advantageous when the pixels arranged in a matrix, in particular LEDs, lie directly on the outer side of the slide tube that is acted on by water, at least in sections, on the inner side. In this way, the thermal conductivity of the water may be additionally utilized for the heat dissipation.

The water slide system may include wetting features, including at least one pump, for wetting the slide surface. Various options may be used for wetting the slide surface. In an aspect, a visible water stream, for example several millimeters in height, which flows along the slide tube may be generated on the slide surface.

Additionally or alternatively, it is possible, at least in sections, to generate merely a moisture film, for example by introducing moisture, e.g., water, via spray nozzles. This design may allow optimal cooling of screen modules situated, for example, in an upper tube section.

As discussed above, in one embodiment of the water slide system, the screen module may be designed as a stereoscopic display, and be actuatable and/or actuated for the simultaneous or time-delayed display of two different images, in particular differing with regard to the viewing angle of the displayed image contents, one for the left eye and another for the right eye of a user, in order to achieve a three-dimensional visual impression. Appropriate stereoscopically prepared image contents may be provided by an image source, such as a media server and/or a playback device. The slightly differing images, which in each case may be curved in two dimensions, possibly due to the preferred screen module curvature, are then combined in the brain to form an overall image for the perception of depth.

In this regard, stereoscopic viewing methods that provide the necessary separation or association of a left- and a right image for the eyes may be referred to as channel separation. As the result of appropriate design of the stereoscopic image information, optionally in conjunction with suitable channel separation features, for example polarized glasses and/or shutter glasses, it may be ensured that each eye is able to see only the image that is associated with it. One approach may include complete channel separation, in which the right image is completely invisible to the left eye, and vice versa. Another option, implementable within the scope of the water slide system of the present disclosure, which achieves a three-dimensional impression, may involve channel separation using circularly polarized light, the user in this case preferably wearing channel separation features in the form of polarized filter glasses. In the polarization process, images for the right eye and the left eye are preferably displayed at the same time, the channel separation features (polarized glasses) preferably allowing only every other line of the image to pass through, thus distributing half-images to both eyes. In an aspect within the scope of the water slide system of the present disclosure is the use of alternative shutter technology. In this approach, the images for the left eye and the right eye are displayed in succession, with control pulses preferably being sent to the channel separation features worn by the user, in particular, for example, shutter glasses. Shutter glasses mutually darken the installed "glass" in each case, in particular an LCD glass, to ensure that each eye sees only the image intended for it. It is also possible to implement a color anaglyphic approach, for example. In order to separate the two single images, preferably displayed at or near the same time, various color filters are used in the channel separation features (in particular, for example, red-green glasses). Alternative stereoscopic approaches are also usable, in particular those that do without additional channel separation features to be worn by the user. With these approaches, the screen module may have multiple pixel planes, in particular in the form of a so-called tensor display, which may be actuated with high refresh rates, such as at rates greater than 200 Hz, in particular 240 Hz or 360 Hz.

For some of the methods mentioned above, in particular the preferred shutter method and the preferred polarization method, it may be necessary for the user to wear channel separation features in an area in front of the eyes during the sliding operation. In the case of the shutter method, the channel separation features may be acted on by a control pulse that is synchronized with the display. For the special feature of a water slide system in which the user slides on a water film on the slide surface in the slide direction, it has proven to be advantageous when the channel separation features are securely and detachably fixable to the head of the user, preferably by tensioning with at least one elastic band and/or integrated into a helmet or a headband or the like. Notwithstanding, it is very advantageous when the channel separation features are designed in the manner of diving or swimming goggles, e.g., in such a way that the goggles are supported via sealing features, in particular an elastomeric material, on the head, about the area of the user's face, in order to avoid impairment of the image perception, and in particular to provide a three-dimensional effect between the eyes and a translucent surface (in particular eyeglasses) of the channel separation features.

In this regard, reference is made to the use of channel separation features, in particular in the form of glasses, preferably shutter glasses or polarized filter glasses, that are fixable, in particular tensionable, preferably on the head of the user, and/or use sealing features for water-tight contact on the body, in particular on the head of the user, during sliding on a water slide having at least one screen module, in particular during use of a water slide system designed according to aspects of the disclosure.

Regardless of whether the screen module of the water slide system is designed and actuated for displaying images with a two-dimensional effect or images with a stereoscopic or three-dimensional effect, according to one example, it is advantageous for the system to have a detector for detecting, at specific points or consecutively or continuously, a position and/or speed (in particular sliding speed) of the user, and for the screen module to be actuatable and/or actuated as a function of the position signal and/or speed signal of the detector, for example, in such a way that two-dimensional or stereoscopic image content, in each case in the form of a video, or alternatively, a stationary image or, in the case of a stereoscopic display, stationary images, which change as a function of the position signal and/or speed signal. In this way, particularly impressive effects may be achieved that are a function of the individual position of the person sliding along the water slide and/or of the person's speed. In one simple example implementation, the position may be detected using a photoelectric barrier, for example. It is also conceivable to arrange multiple photoelectric barriers (or other detection sensors) one behind the other in the slide direction in order to obtain position information and/or speed information that continues in a stepped manner. Alternatively, continuous position detection using suitable sensor features, for example a camera, or alternatively, multiple cameras, may be used.

The disclosure also sets forth a method for operating a water slide system designed according to various aspects of the disclosure. According to such aspects, it is provided that the at least one screen module is actuated in such a way that a moving image that is curved in the circumferential direction and is visible from the interior of the slide tube is displayed by the pixels of the screen module arranged in a matrix. The image may be provided by an image source, for example, a media server or a video player. The image may extend over multiple screen modules, thus resulting in an overall, in particular moving, image.

In an aspect of the method, the screen module or multiple screen modules may be supplied or actuated for displaying a moving (video) overall image, using stereoscopic images, to achieve a three-dimensional effect for the user. Depending on the technology used, during the sliding operation, the user may wear appropriate channel separation features (see the above discussion) or these may be provided to the user for use during sliding. It has been found to be particularly advantageous when these channel separation features are worn fixed in position on the body, e.g., may be detachably fixed to the body of the user, for example by tensioning using an elastomeric feature, such as an elastomeric band, or alternatively, the channel separation features may be equipped with sealing features for tight contact with the body, such as the head of the user, to prevent water from entering the area between the eyes, and the translucent surface of the channel separation features.

BRIEF DESCRIPTION OF THE DRAWINGS

Further advantages, features, and particulars of the invention result from the following description of preferred exemplary embodiments and with reference to the drawings, which show the following.

Identical elements, and elements having the same function, may be denoted herein by the same reference numerals.

DETAILED DESCRIPTION

Figure 1:
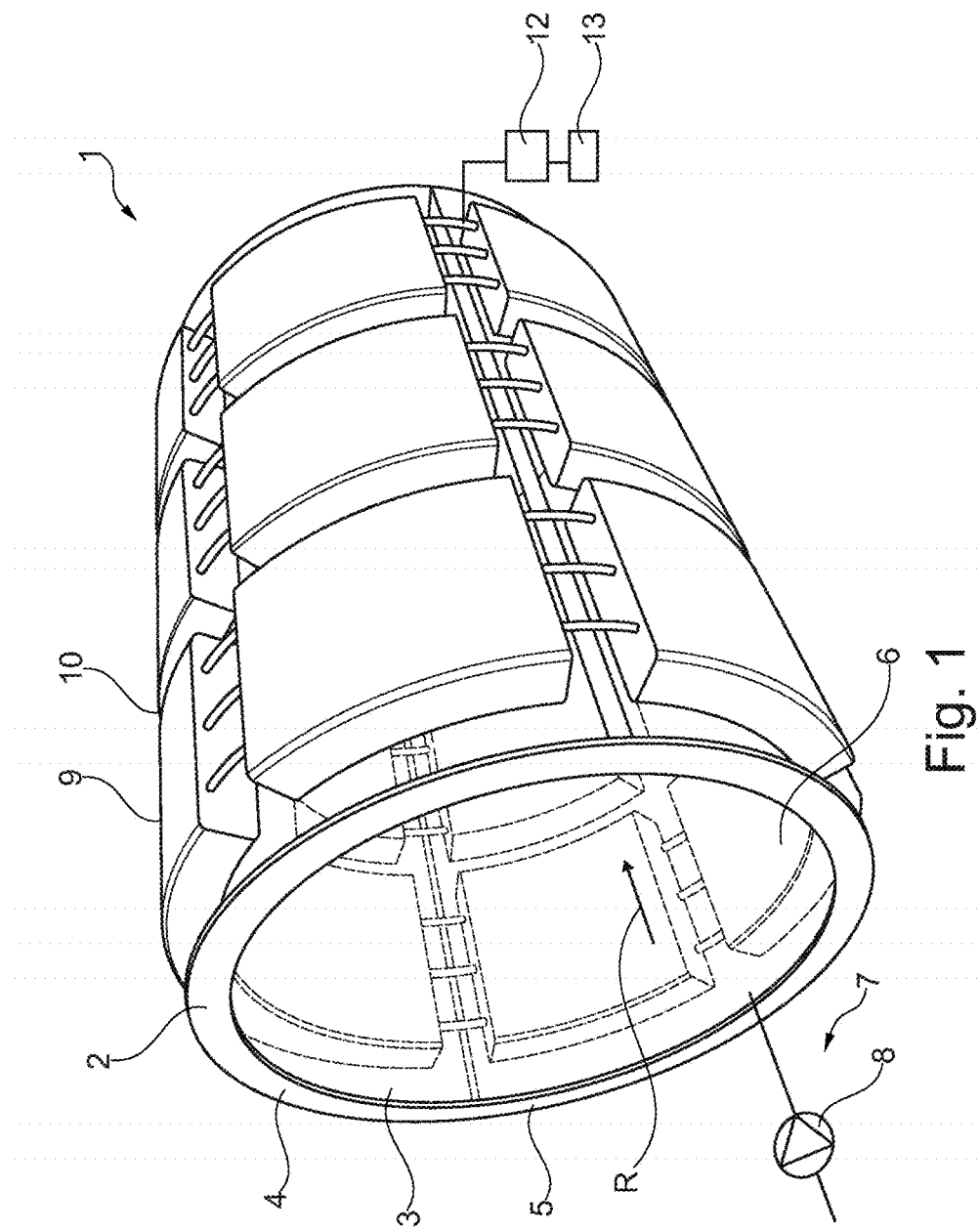
FIG. 1 shows a section of a water slide designed as a tube slide, with a plurality of screen modules arranged in a matrix, in accordance with aspects of the present disclosure, FIG. 2 schematically shows the electronic design of a water slide system, in accordance with aspects of the present disclosure.

FIG. 1 shows a section of a water slide system 1 that comprises a slide tube 2 made of translucent or transparent material. The slide tube 2, in a manner known in the related art, may be made up of multiple tube modules 3 arranged one behind the other in a slide direction R, each tube module 3 in turn being mounted from multiple, in the present case a shown, two, shells 4, 5, specifically, an upper shell 4 and a lower shell 5.

The slide tube 2 in its interior forms a slide surface 6 that extends in the slide direction R. The slide surface 6 may be wetted with the aid of wetting features 7. In the specific example embodiment shown, the wetting features 7 include a pump 8 that conveys a water stream in a circuit, the water being introduced in an upper slide area and collected in a lower slide area, and then provided once again to the water circuit.

It is apparent than a plurality of screen modules 10 may be situated on an outer side of the slide tube 2, illustrated here with a circular cross section by way of example, the screen modules each having a plurality of pixels (not illustrated), in the form of high-performance LEDs. The LEDs may be arranged in columns and rows, e.g., in the form of a surface matrix, the pixels being individually actuatable in order to display images, such as moving images.

In an aspect, each screen module may have a minimum number of 15,876 LEDs (individual units) per square meter.

The screen modules 10 may optionally be curved only about an axis that extends in the slide direction R, e.g., in the circumferential direction of the slide tube, and have rows of pixels arranged in parallel to the slide direction R. The columns, oriented essentially perpendicularly thereto, follow the curvature of the outer side of the slide tube.

The screen modules 10 with their pixels may rest on the curved outer side. It is apparent that the screen modules 10 may have a shell-like design, and in each case may extend over a circumferential angle of greater than about 45°, and over at least about 0.5 m in each case in the slide direction R.

It is apparent from the arrangement according to FIG. 1 that a plurality of screen modules 10, six in each case as shown in this specific specific example embodiment, are arranged next to one another in the circumferential direction. Screen modules 10 are also arranged one behind the other in the slide direction R, so that by appropriately subdividing an original image, it is possible to divide it over the plurality of screen modules arranged in a matrix, so that all screen modules 10 or a group of these screen modules 10 display an overall image, which means that each of the screen modules shows an image detail.

In the specific example embodiment shown, in each case two adjacent screen modules 10 in the circumferential direction and in each case two adjacent modules in the slide direction are spaced apart from one another; one embodiment is also achievable in which the adjacent screen modules in the circumferential direction and/or the screen modules situated one behind the other in the slide direction R directly adjoin one another to thus allow a cohesive visual impression.

Figure 3:
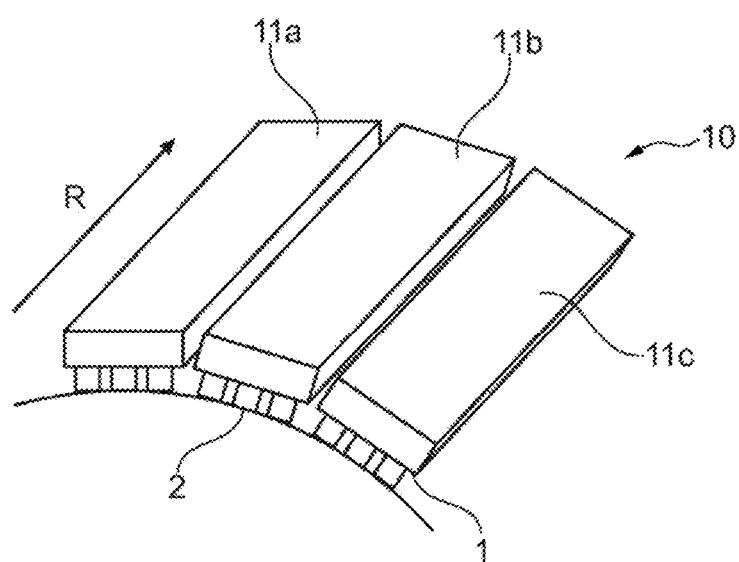
FIG. 3 shows a schematic side view of the design of a screen module for a water slide system in accordance with aspects of the present disclosure.

The shell-like design of the screen modules 10, curved in the circumferential direction, is apparent in FIG. 1. This effect may be achieved in various ways. It is thus conceivable to use a curved LED carrier. Alternatively, as shown in FIG. 3, it is possible to use a screen module 10 that has multiple module surface sections 11a through 11c, in each case two adjacent module surface sections 11a through 11c spanning an angle with respect to one another. The pixels, such as LEDs, of each module surface section 11a through 11c in each case may span a (straight or noncurved) plane. In the simplest case, each section of the module surface sections may have only a single row of pixels extending in the slide direction R. However, each module surface section R may preferably have a plurality of such parallel rows extending in the slide direction R.

A design in which the module surface sections 11a through 11c are articulatedly connected to one another in order for the module surface sections to lie around the slide tube in the circumferential direction, essentially regardless of their diameter, is particularly advantageous in some implementations. Adaptation to different diameters is easily possible due to the articulated connection.

In FIG. 1, screen modules 10, as mentioned, are arranged over the entire circumference of the slide tube 2. An alternative embodiment, not shown, is conceivable in which only a partial circumferential section is provided with screen modules 10. The slide tube may thereby have a reflective design in the remaining section in order to give the optical impression that more screen modules are provided than is actually the case. For example, it is conceivable to provide only the upper shell 4 or only the lower shell 5 with screen modules 10, and to provide a reflective design, at least in sections, for the respective other shell.

It is apparent from the schematic illustration according to FIG. 1 that the screen modules arranged in a matrix are actuated via actuating features 12, which may include, for example, a video processor. The actuating features 12 may be supplied with an image signal, such as a video signal, from an image source 13, such as a media server.

Figure 2:
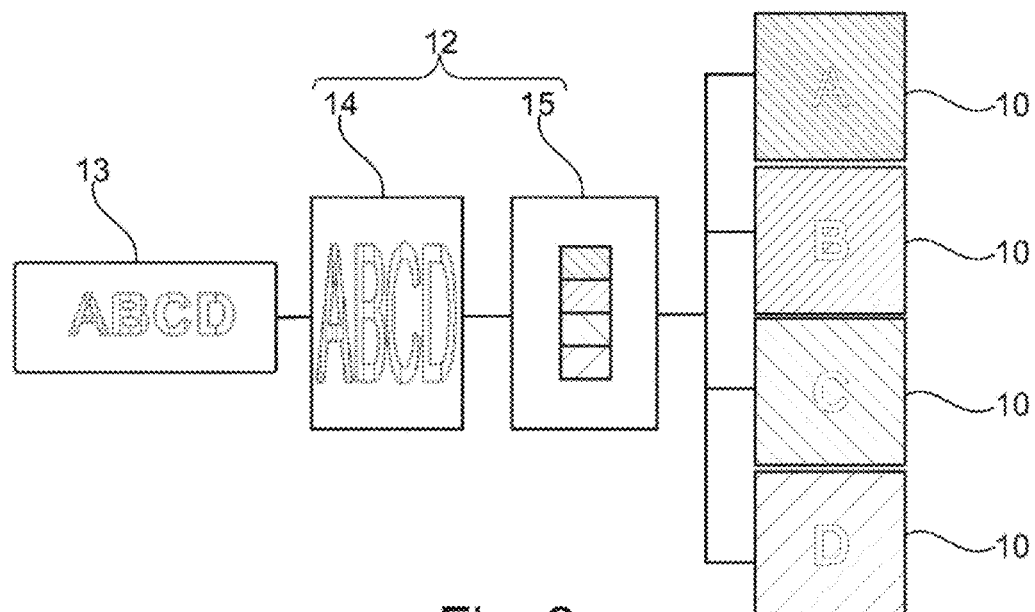

FIG. 2 shows a more detailed design of an example electronics system usable in accordance with aspects of the present disclosure. The image source 13, which may be coupled to the actuating features 12 in a signal-conducting manner, may be located to the left in FIG. 2. The actuating features 12 may include a video processor unit 14 (video processor), which in turn is connected in a signal-conducting manner to a video splitter unit 15, which may divide an overall image over four, by way of example, screen modules 10. These screen modules 10 may be arranged next to one another in the circumferential direction or one behind the other in the slide direction. FIG. 2 shows only the basic schematic design. Of course, the video splitter unit 15 may be designed in such a way that it supplies a curved matrix of screen modules 10, as shown in FIG. 1, for example.

In some example implementations, the screen modules may be supplied or actuated with stereoscopic images via the actuating features 12 for achieving a three-dimensional effect for the user, such as when an overall image is achieved by appropriately actuating multiple screen modules via the video splitter unit 15.

It may be advantageous in some implementations, when the detector (not illustrated) for detecting a position and/or a speed of the user is provided, and the detector is directly or indirectly connected to the actuating features 12 in a signal-conducting manner, for the actuating features 12 to adapt or change image content as a function of a detected position and/or speed.

Figure 4:
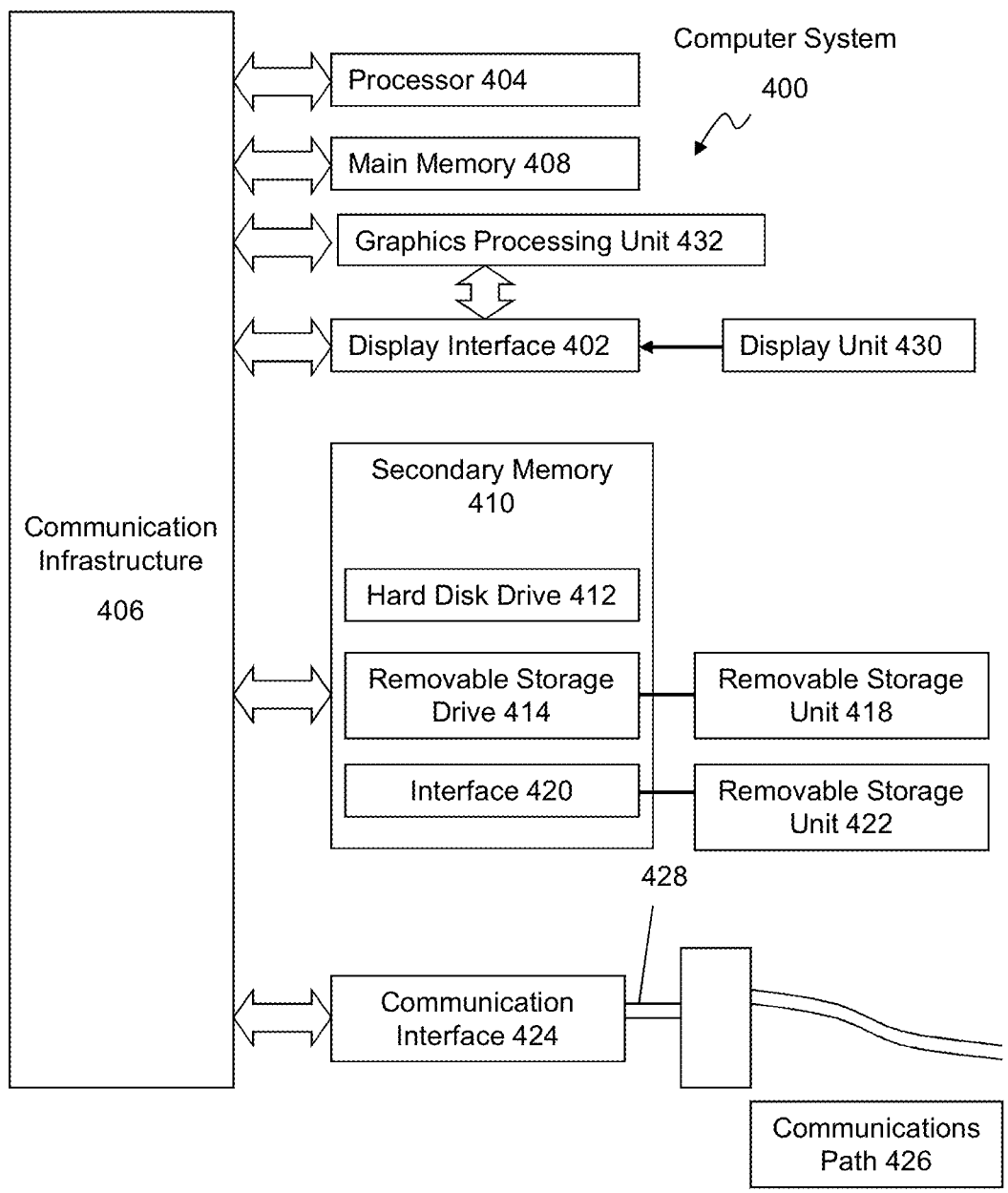
FIG. 4 illustrates various features of an example computer system for use in conjunction with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 400 is shown in FIG. 4.

Computer system 400 includes one or more processors, such as processor 404 and a graphics processing unit 432, which may correspond to the video processor unit 14. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 400 can include a display interface 402 that forwards graphics, text, and other data from the communication infrastructure 406 (from the graphics processing unit 432 or from a frame buffer (not shown)) for display on a display unit 430. In an aspect, the display unit 430 may correspond to the screen module 10 or one or more of the the module surface sections 11a, b, c. Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, a universal serial bus (USB) flash drive, etc. The removable storage drive 414 reads from and/or writes to a removable storage unit 418 in a well-known manner. Removable storage unit 418 represents a floppy disk, magnetic tape, optical disk, USB flash drive etc., which is read by and written to removable storage drive 414. As will be appreciated, the removable storage unit 418 includes a computer usable storage medium having stored therein computer software and/or data.

Alternative aspects of the present invention may include secondary memory 410 and may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 414 and a hard disk installed in hard disk drive 412. These computer program products provide software to the computer system 400. Aspects of the present invention are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present invention, as discussed herein. In particular, the computer programs, when executed, enable the processor 404 to perform the features in accordance with aspects of the present invention. For example, the processor 404 may perform features associated with the actuating features 12 described herein. Accordingly, such computer programs represent controllers of the computer system 400.

In an aspect of the present invention where the invention is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, the invention may be implemented using a combination of both hardware and software.

Figure 5:
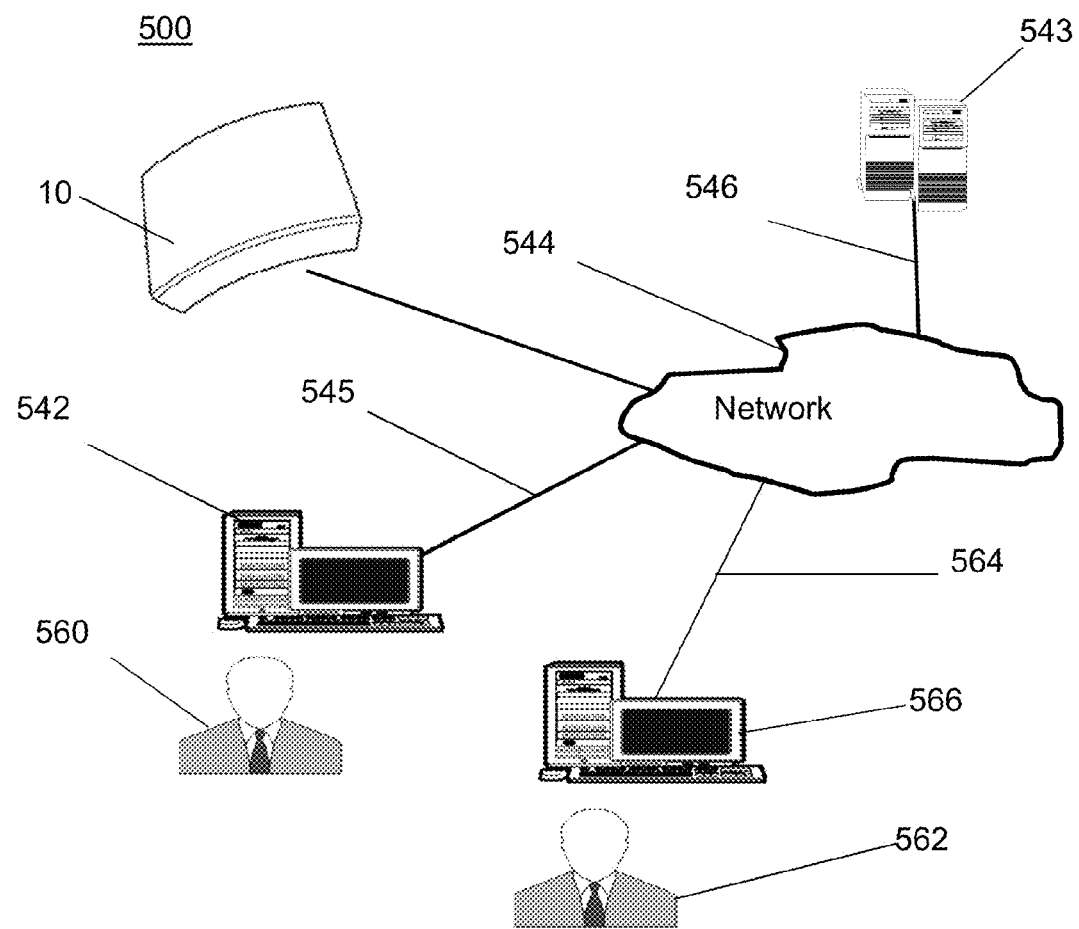
FIG. 5 illustrates an example system diagram of various hardware components and other features for use in accordance with aspects of the present invention.

FIG. 5 shows a communication system 500 usable in accordance with aspects of the present invention. The communication system 500 includes one or more accessors 560, 562 (also referred to interchangeably herein as one or more "users") and one or more terminals 542, 566. In one aspect of the present invention, data for use is, for example, input and/or accessed by accessors 560, 562 via terminals 542, 566, such as personal computers (PCs), minicomputers, mainframe computers, microcomputers, telephonic devices, or wireless devices, personal digital assistants ("PDAs") or a hand-held wireless devices (e.g., wireless telephones) coupled to a server 543, such as a PC, minicomputer, mainframe computer, microcomputer, or other device having a processor and a repository for data and/or connection to a repository for data, via, for example, a network 544, such as the Internet or an intranet, and/or a wireless network, and couplings 545, 546, 564. The couplings 545, 546, 564 include, for example, wired, wireless, or fiberoptic links. In another aspect of the present invention, the method and system of the present invention may include one or more features that operate in a stand-alone environment, such as on a single terminal. For example, the server 543 may correspond to the image source 13. The terminals 542, 566 may include actuating features 12 (e.g., processor 404 and/or graphics processing unit 432). In an aspect, the images may be transmitted over the network 544 to one or more screen modules 10. In another aspect, the actuating features 12 may be incorporated with the screen module 10 and operate on data received from the image source 13.

While aspects of the present invention have been described in connection with examples thereof, it will be understood by those skilled in the art that variations and modifications of the aspects of the present invention described above may be made without departing from the scope hereof. Other aspects will be apparent to those skilled in the art from a consideration of the specification or from a practice in accordance with aspects of the invention disclosed herein.

LIST OF REFERENCE SYMBOLS 1 water slide system
2 slide tube
3 tube module
4 upper shell
5 lower shell
6 slide surface
7 wetting features
8 pump 9 outer side
10 screen module
11a, b, c module surface sections
12 actuating features
13 image source
14 video processor unit
15 video splitter unit
R slide direction
400 computer system
402 display interface
404 processor
406 communication infrastructure
408 main memory
410 secondary memory
412 hard disk drive
414 removable storage drive
418 removable storage unit
420 communications interface
422 other removable storage units
424 communications interface
426 path
428 signals
430 display unit
432 graphics processing unit
500 communication system
542 terminals
543 server
544 network
545 couplings
546 couplings
560 accessors
562 accessors
564 couplings
566 terminals

What is claimed is:

1. A water slide system, comprising:
a circumferentially closed slide tube having an inner surface and an outer surface, the slide tube being translucent or transparent at least in part, wherein a slide surface resides on the inner surface, the slide surface being wettable via a received liquid and extending in a slide direction for a user; and
lighting features that are visible from the interior of the slide tube situated on the outer side of the slide tube in order to achieve optical effects in the interior of the slide tube,
characterized in that
the lighting features are formed from a plurality of pixels arranged in a matrix, the matrix being incorporated in at least one shell-like screen module that extends on the outer side of the slide tube and over a circumferential section of the slide tube, and which is actuatable in order to display moving two-dimensional and/or stereoscopic images that are curved in the circumferential direction.

2. The system according to claim 1,
characterized in that different colors are displayable in each case with the pixels.

3. The system according to claim 1,
characterized in that the at least one screen module is connected to actuating features which includes a video processor, the actuating features being connectable and/or connected to an image source.

4. The system according to claim 3,
characterized in that the image source is designed for providing stereo image information.

5. The system according to claim 1,
characterized in that multiple screen modules that are designed and/or arranged in the form of a shell are provided on the outer side of the slide tube, arranged next to one another in the circumferential direction and/or one behind the other in the slide direction.

6. The system according to claim 5,
characterized in that the actuating features include a video splitter for displaying an in particular moving overall image with multiple of the, screen modules.

7. The system according claim 5,
characterized in that the actuating features are designed in such a way that an image that extends over all pixels of a screen module and/or an image portion that extends over multiple pixels are/is displaceable from pixel to pixel and/or from screen module to screen module in the circumferential direction of the slide tube and/or in the slide direction and/or opposite the slide direction.

8. The system according to claim 1,
characterized in that the screen module has multiple module surface sections which are connected to one another in an articulated manner, and which in each case include pixels arranged in a matrix or in a row, in each case two adjacent module surface sections spanning an angle.

9. The system according to claim 1,
characterized in that the slide tube is provided over the entire circumference with at least one screen module, at least in a slide section extending in the slide direction, for creating an image that extends over the entire circumference.

10. The system according to claim 1,
characterized in that the slide tube is provided over only a partial circumference with at least one screen module, at least in a slide section extending in the slide direction.

11. The system according to claim 10,
characterized in that the slide tube has a reflective foil in the partial circumference which is not provided with a screen module and which contains the slide surface, for reflecting the image displayed on the at least one screen module section.

12. The system according to claim 1,
characterized in that the pixels of the at least one screen module lie directly against the outer side of the slide tube to ensure good heat transfer.

13. The system according to claim 1,
characterized by wetting features for wetting the slide surface by generating a water stream in the water slide in the slide direction or by generating a moisture film on the slide surface.

14. The system according to claim 1,
characterized in that the screen module is designed as a stereoscopic display and is actuatable and/or actuated for the simultaneous or time-delayed display of two different images for the left eye and the right eye of a user in order to achieve a three-dimensional visual impression.

15. The system according to claim 14,
characterized in that the system has channel separation features, which may be carried along in the slide direction by the user while sliding, for the defined association of the images, displayed on the screen module, with the eyes of the user.

16. The system according to claim 15, characterized in that the channel separation features are designed as glasses that are wearable in front of the eyes of a user and are fixable, in particular tensionable on the head of the user.

17. The system according to claim 16, characterized in that the glasses have sealing features for contacting the user in a sealing manner to prevent water from penetrating an area in front of the eyes.

18. The system according to claim 1, characterized in that the system has a detector for detecting a position and/or speed of the user, and the screen module is actuatable and/or actuated as a function of a position signal and/or speed signal.

19. A method for operating a water slide system according to claim 1 characterized in that the at least one screen module is actuated in such a way that a particular moving image that is visible from the interior of the slide tube, is displayed by the pixels of the screen module arranged in a matrix.

20. The method according to claim 19, characterized in that two images that are different for the left eye and the right eye of a user are displayed simultaneously or in a time-delayed manner on the at least one screen module, for achieving a three-dimensional visual impression.

21. The method according to claim 20, characterized in that the user wears channel separation features, in front of his/her eyes, with which the images displayed on the screen module are associated with the eyes of the user in a defined manner.

22. The method according to claim 19, characterized in that the position and/or the speed of the user while sliding are/is detected, and the image content displayed by the at least one display module is adapted as a function of a detected position and/or sliding speed.

* * * * *